Figure 1:
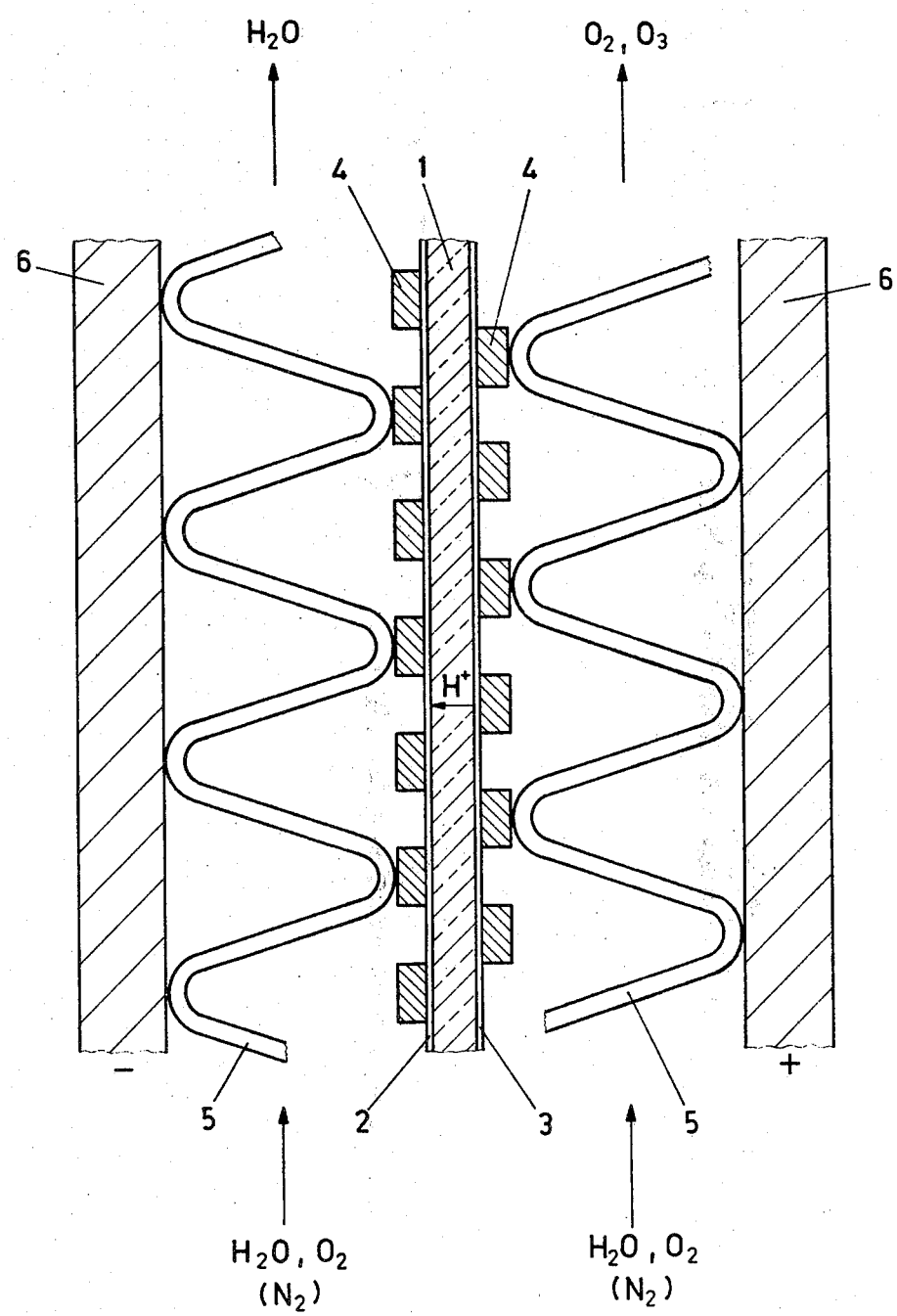

United States Patent [19]

Menth et al.

[11] 4,416,747

[45] Nov. 22, 1983

[54] PROCESS FOR THE SYNTHETIC PRODUCTION OF OZONE BY ELECTROLYSIS AND USE THEREOF

[75] Inventors: Anton Menth, Nussbaumen; Samuel Stucki, Baden, both of Switzerland

[73] Assignee: BBC Brown, Boveri & Company Limited, Baden, Switzerland

[21] Appl. No.: 373,107

[22] Filed: Apr. 29, 1982

[30] Foreign Application Priority Data

May 11, 1981 [CH] Switzerland ............... 3023/81

[51] Int. Cl.$^3$ ............................................. C25B 1/02
[52] U.S. Cl. ............................................. 204/129
[58] Field of Search ................................. 204/129

[56] References Cited

U.S. PATENT DOCUMENTS

| | | | |
|---|---|---|---|
| 4,311,569 | 1/1982 | Dempsey et al. | 204/129 |
| 4,315,805 | 2/1982 | Darlington et al. | 204/129 |
| 4,316,782 | 2/1982 | Foller et al. | 204/129 |

*Primary Examiner*—R. L. Andrews
*Attorney, Agent, or Firm*—Oblon, Fisher, Spivak, McClelland & Maier

[57] ABSTRACT

Electrolytic production of ozone by a process wherein an oxygen-saturated mixture of water and oxygen, or air, is led along both sides of a solid electrolyte (1), which acts as an ion-exchange membrane and carries coatings (2,3) of electrically conductive materials, both on the cathode side and on the anode side, ozone being evolved, in addition to oxygen, on the anode side and, on the cathode side, the evolution of hydrogen being suppressed by the depolarizing effect of the oxygen which is entrained in the water stream, and merely water being formed. The electrolysis is carried out under an increased pressure.

Individual electrolysis cell bounded by bipolar plates (6), and comprising a solid electrolyte (1), provided, in each case, with a surface coating (2,3), and centrally located between current-collectors (4) and adjoining open metallic structures (5). A plurality of individual cells integrated together between end plates (7), electrically connected in series and hydrodynamically connected in parallel, combined to form a block.

Use in water-treatment, and as a component of chemical processes (oxidation processes).

6 Claims, 3 Drawing Figures

PROCESS FOR THE SYNTHETIC PRODUCTION OF OZONE BY ELECTROLYSIS AND USE THEREOF

The invention starts from a process for producing ozone according to the generic description of claim 1, and from an appliance according to the generic description of claim 4 and the use thereof, according to the generic description of claims 6 to 9.

As a rule, ozone is produced on the industrial scale by means of corona-type electrical discharges in air or oxygen (e.g. Siemens "Ozonizer"). Moreover, it has been observed, in electrochemical cells with anodes having a high overvoltage (Pt, PbO$_2$) that, in addition to the evolution of oxygen, ozone also occurred as a by-product (e.g. H. P. Fritz, J. C. G. Thanos, D. W. Wabner, "Ozone Synthesis by Electrolysis of Water", Zeitschrift für Naturforschung, Vol. 34b, pages 1617–1627, 1979). It is known that the current efficiency and consequently the proportion, expressed as a percentage, of ozone in the oxygen which is anodically liberated at the PbO$_2$, can be considerably increased by the use, in the electrolyte, of anions containing fluorine, as a result of which this process can start to compete, in energy-related terms, with the Siemens "Ozonizer" (e.g. P. C. Foller, C. W. Tobias, Ext. Abstract No. 628, "The generation of ozone by the anodic oxidation of water", Electrochem. Soc. Fall Meeting 1980, Hollywood, Fla., Pages 1567–1568). According to the latter literature reference, current efficiencies of 50% and efficiencies of 5–10% were to be expected.

The latter process is distinguished by the toxic nature of the electrolyte, which requires that care must be taken to ensure a clean separation between the electrolyte and the gas mixture which is produced. Moreover, for reasons concerned with the chemical/thermodynamic equilibrium, the eletrolytic production of ozone must be carried out at the lowest possible temperatures, and this necessitates extensive cooling devices. There accordingly exists a pronounced need for the improvement and simplification of the processes and appliances.

The object underlying the invention is to indicate a process and an appliance for the synthesis of ozone by means of electrolysis, this process and appliance ensuring that the process can be conducted in a simple manner, while also ensuring reliable removal of the heat, without expensive cooling devices and while avoiding the use of a chemically aggressive electrolyte.

This object is achieved, according to the invention, by means of the features of claims 1 and 4.

Figure 2:
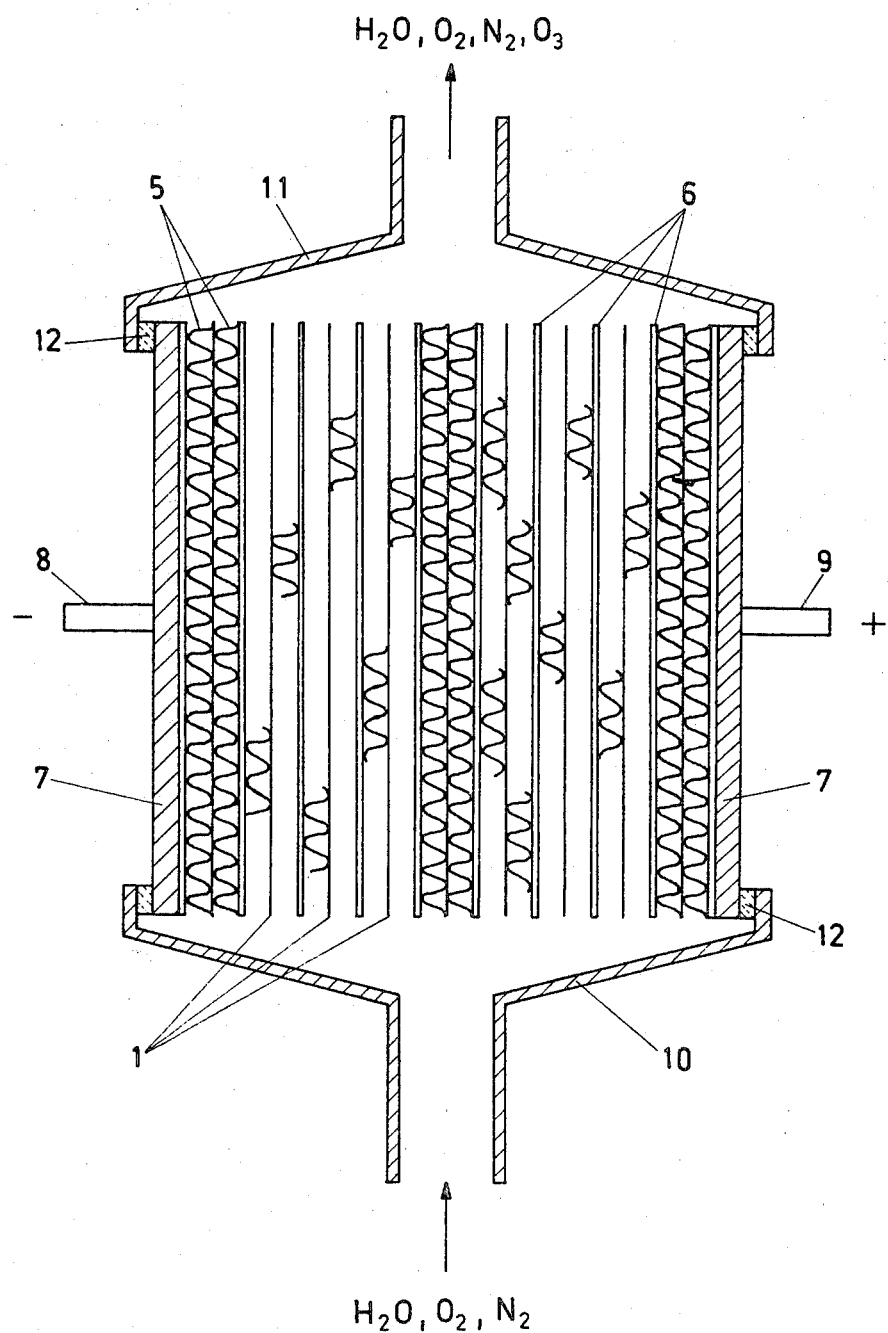
Figure 3:
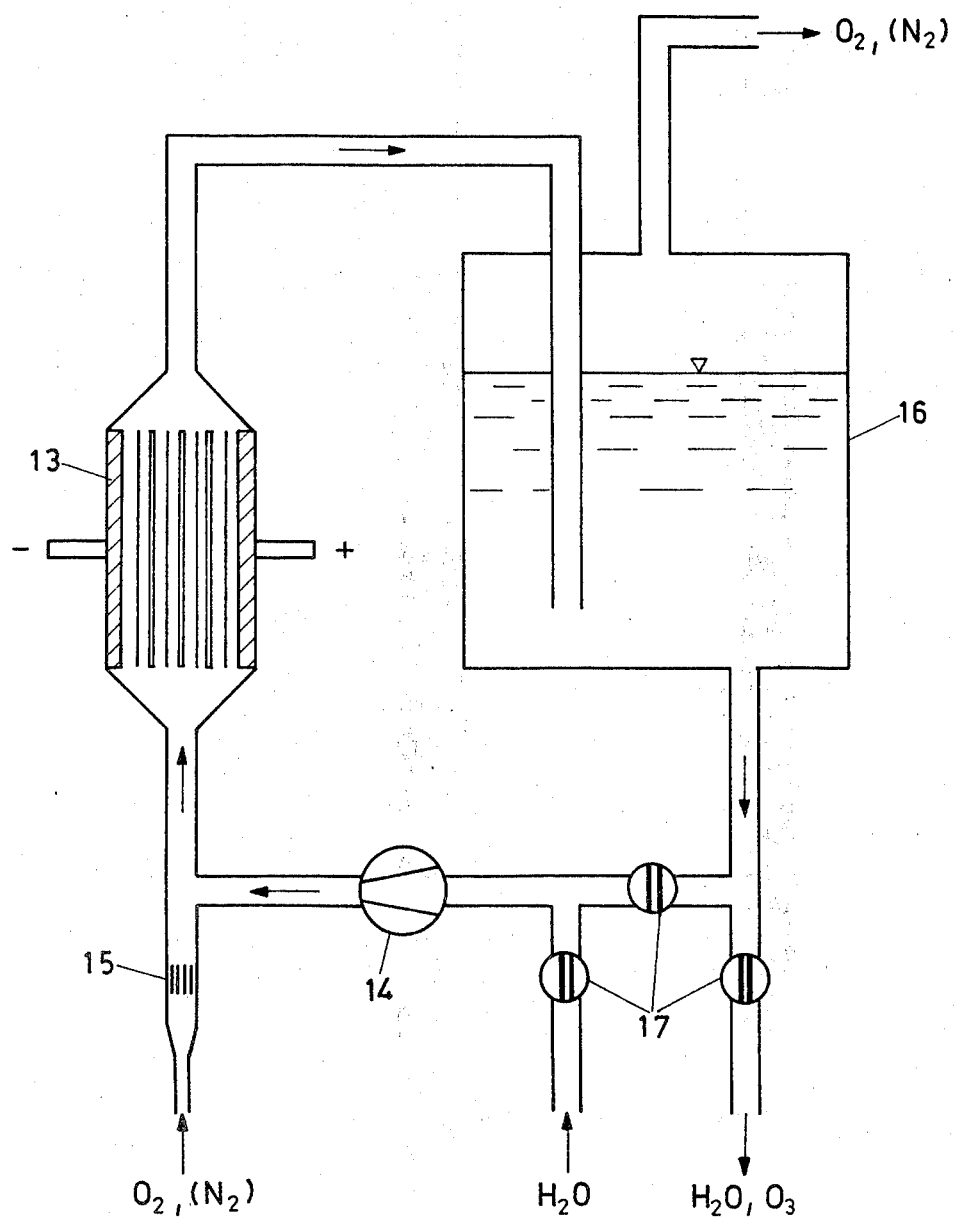

The invention is described by reference to the illustrative embodiment which follows, and which is explained by means of the Figures, in which:

FIG. 1 shows a diagrammatic section through a portion of an ozone electrolysis cell, FIG. 2 shows a diagrammatic section through an appliance for producing ozone, which comprises a plurality of electrolysis cells, FIG. 3 shows a diagrammatic representation of the installation required for carrying out the process.

A portion of an ozone electrolysis cell is represented diagrammatically in FIG. 1, in section. 1 is a solid electrolyte (plastic polymer e.g. based on perfluorinated sulphonic acids) in the form of a thin ion-exchange membrane. On the cathode side, this membrane is provided with a surface coating 2 and, on the anode side with a coating 3. Platinum metals are preferably used for the coating 2, on the cathode side, and PbO$_2$ is preferably used for the coating 3, on the anode side. Current-collectors 4 are located on both sides of the coated solid electrolyte 1, these collectors ensuring that a good current-distribution is obtained over the entire area of the membrane. These current-collectors can be made of a fine woven wire mesh, from fine, close-meshed expanded metal, or from a thin perforated metal sheet. 5 is an open structure, made from an expanded metal, or from woven wire, having a comparatively low resistance to the flow of a liquid in the direction parallel to the principal plane of symmetry of the planar structure. Both 4 and 5 must be made from a corrosion-resistant material, preferably from titanium or a titanium alloy. The ends of the cell are formed, in each case, by a bipolar plate 6, which alternately acts as a cathode and as an anode, and which is indicated, in the individual cell, with − and +. This plate is preferably made from a stainless (Cr/Ni) steel. The space between the bipolar plates 6 and the solid electrolyte 1 is completely filled with liquid (H$_2$O, in which O$_2$ or air is suspended and/or dissolved). The flow direction is indicated by arrows (upwards from the bottom, but can also take place horizontally).

FIG. 2 shows a diagrammatic section through an appliance for the production of ozone, which comprises a plurality of electrolysis cells. The reference numbers 1, 5 and 6 represent the same components as indicated in FIG. 1. For the sake of clarity, the open structures 5 are only partially represented in the drawings. The assembly of the electrolysis cells basically corresponds to the filter-press type, but the liquid is led parallel to the principal planes of the cells instead of perpendicularly to these planes. The individual cells are held together, between the two end plates 7, by means of clamping elements (bolts, screws, grippers, nuts), not represented in the drawing, terminals 8 (−) and 9 (+) being attached to these end plates in order to make the electrical connection. 10 is a distributor-box, with an inlet pipe, and 11 is a collector-box, with an outlet pipe. Around their periphery, the boxes 10 and 11 are attached to the cell-stack via, in each case, an insulating frame 12, which simultaneously serves as a gasket. The liquid is indicated by chemical symbols, and its flow direction is indicated by appropriate arrows, upwards, from the bottom.

The entire installation required for carrying out the process is diagrammatically represented in FIG. 3. The electrolysis block 13 is connected to a direct current source via its terminals + and −. The block is located in the stream of liquid, which is indicated by arrows. 14 is a pump, which conveys water via a stopcock 17. Air or oxygen is supplied, under pressure, via the gas-permeable frit 15. A gas separator 16 is located at the outlet from the electrolysis block 13, the liquid level in this separator being marked by a triangle symbol. The water/ozone mixture reaches the outlet via a further stopcock 17. Different circulations can be brought about, as desired, by selecting the setting, in each case, of one stopcock 17.

MODE OF OPERATION AND ILLUSTRATIVE EMBODIMENT

See FIGS. 1 to 3

The principle resides in the fact that ozone is produced, in situ, on the anode side of the solid electrolyte 1, in aqueous solution, while water is formed on the cathode side. Water, which is saturated with oxygen ($O_2$) or with a gas containing oxygen, e.g. air ($O_2$, $N_2$), is introduced into the cell, and is allowed to flow along the surface of the solid electrolyte 1, both on the anode side (surface coating 3) and on the cathode side (surface coating 2). The solid electrolyte 1 is coated with electrode materials in the form of powders, e.g. $PbO_2$ on the anode side, as coating 3, and Pt on the cathode side, as coating 2. Electrical contact with the coatings 2 and 3 is effected via the current-collectors 4 and the open structures 5. In the process, the water serves both as a reactant and as a coolant.

The water is decomposed by the electrolysis process, both oxygen and ozone being formed on the anode side:

$$H_2O \rightarrow 2H^+ + 2e^- + \tfrac{1}{2}O_2$$

$$H_2O \rightarrow 2H^+ + 2e^- + \tfrac{1}{3}O_3$$

The hydrogen ions migrate through the solid electrolyte 1, which is acting as an ion-exchange membrane, and arrive at the cathode side (indicated by $H^+$ and arrow), where, assisted by intense convection, they react with the oxygen which is entrained in the liquid (high saturation of the $O_2$, in the form of pure oxygen or atmospheric oxygen, suspended and/or dissolved in the water). By this means, the evolution of hydrogen at the cathode is suppressed (fuel-cell cathode):

$$2H^+ + 2e^- + \tfrac{1}{2}O_2 \rightarrow H_2O$$

No harmful aggressive products are therefore formed in the cathode space, but merely neutral water. It is consequently possible to dispense with leading separate streams of liquid from the anode and cathode spaces. As a result, only a single liquid circuit is required.

The electrolysis block 13 comprised 4 individual electrolysis cells corresponding to the construction according to FIG. 1, these cells being located, electrically, in series and being arranged in parallel with regard to the stream of liquid. The electrode area measured on one side, was 100 cm$^2$. An ion-exchange membrane, based on perfluorinated sulphonic acids, and marketed by Dupont under the trade name Nafion 125, served as the solid electrolyte 1, the thickness of this membrane being 0.125 mm. The coating 2, on the cathode side, was composed of a mixture of 85% by weight of active carbon powder and 15% by weight of platinum powder, the coating thickness being 2 mg/cm$^2$. The coating 3, on the anode side, was composed of $\beta$-$PbO_2$ powder, applied to a thickness of 4 mg/cm$^2$. A plastic polymer was used as a binder for both coatings, 2 and 3. A woven wire mesh, made of platinized titanium, with the aperture-width "70 mesh" (760 meshes or holes per cm$^2$) served as the current-collector 4 on both sides of the solid electrolyte 1. The open structure 5 was composed of an expanded metal, made of titanium, the size of the diamonds being 6×4 mm. A stainless (Cr/Ni) steel sheet, 0.2 mm thick, was used as the bipolar plate 6.

Water was delivered at the rate of 20 l/min by means of the pump 14. At the same time, air was forced into the system, via the gas-permeable frit 15, at the rate of 20 l/min. The temperature of the liquid at the inlet to the electrolysis block 13 was 12° C. At a current density of 1 A/cm$^2$, the resulting total voltage across the terminals of the electrolysis block 13 was 12.2 V. The liquid temperature at the outlet from the electrolysis block 13 was 13° C. The steadystate condition was reached after 1 hour of operation. The concentration of ozone in the outflow, downstream of the gas separator 16, was determined iodometrically, and amounted to approximately 0.01 g/l.

The invention is in no way limited to the illustrative embodiment. In principle, the bipolar plate 6 can be made of a material which is corrosion-resistant under the prevailing conditions, e.g. of steel, in particular of Cr/Ni-steel, and can have a thickness of 0.1 to 1 mm, depending on the size of the cell. The metallic structure 5, on the anode side, can preferably be made from titanium and, on the cathode side, it can likewise be made from titanium, or from a suitable stainless (Cr/Ni) steel and can have a thickness of 0.5 to 5 mm. The solid electrolyte, based on perfluorinated sulphonic acids, can have a thickness of 0.05 to 0.2 mm. The coating 2 (cathode side) and the coating 3 (anode side) are preferably composed of platinum, or of a platinum metal, on the one side, and of $PbO_2$, on the other side. The $PbO_2$ can also be replaced by another material having a high ozone-yield.

The essential advantage of the invention resides in the fact that ordinary water and a gas which contains oxygen can be used as starting materials, so that no chemically aggressive anions of any kind are needed. Furthermore, separation of the anolyte from the catholyte, at the outlet from the cell, is superfluous, since no harmful or aggressive by-products of any kind are formed. The entire installation can accordingly function with a single liquid circuit.

The process can also be operated at a pressure in excess of atmospheric pressure, that is to say, at pressures of up to 10 MPa. Since the solubility of ozone in water rises approximately linearly with pressure, it is possible, in this way, to produce concentrated solutions with a high ozone content.

The process opens up a large number of applications, and can be employed, in an economical manner, preferably where oxidation processes have to take place in an aqueous solution. This applies, in particular, to all types of treatment of drinking water, cooling water, process water and waste water, in which at least a portion of the water to be treated is directly charged with ozone, in situ. In addition to this, there is the possibility of producing aqueous ozone-concentrate, namely water with a high ozone content, directly in the electrolysis cell, under pressure, and to inject the concentrated solution into the water which is to be treated. Moreover, the electrolysis can be carried out either in the mainstream, in a partial stream, or in the encircling stream of the liquid circuit. The latter can be either open or closed. The process can be contained, as a single partial step, or as a partial step which recurs repeatedly, in an integrated treatment-circuit. The same considerations apply in the case of integrated chemical/physical processes, in which one or more oxidation steps are required.

LIST OF REFERENCE NUMBERS

1. Solid electrolyte (plastic polymer, ion-exchange membrane)
2. Surface coating (cathode side)
3. Surface coating (anode side)
4. Current-collector
5. Open structure (expanded metal, woven wire)
6. Bipolar plate
7. End plate
8. Negative terminal 9. Positive terminal
10. Distributor-box, with inflow pipe
11. Collector-box, with outflow pipe
12. Insulating frame (gasket)
13. Electrolysis block
14. Pump
15. Gas-permeable frit
16. Gas separator
17. Stopcock

We claim:

1. Process for the synthetic production of ozone by electrolysis, wherein water saturated with oxygen is used as starting material and, as the electrolyte, a solid electrolyte is used, which is coated with platinum on the cathode side and with $PbO_2$ on the anode side and is in the form of a thin cation exchange membrane, wherein the oxygen-saturated water is led along, both on the cathode side and on the anode side, parallel to the solid-electrolyte membrane, and wherein the current supply to the coatings of the solid electrolyte, which serve as electrodes, is effected, in each case, via an open metallic structure having a low flow-resistance for the water, and wherein the water is simultaneously utilized for removing the heat generated during the process.

2. Process as claimed in claim 1, wherein water and atmospheric air are used to form the oxygen-saturated water starting materials and, as the solid electrolyte, a cation exchange membrane composed of a polymer based on perfluorinated sulphonic acids is used.

3. Process as claimed in claim 1, wherein the electrolysis process is carried out under a pressure of up to 10 MPa, and wherein a solution of ozone in water is produced, which is subject to this pressure.

4. Process as claimed in claim 1, wherein ozone so-produced is used in the treatment of drinking water, cooling water, process water or waste water by leading at least a portion of the water to be treated along, both on the cathode side and on the anode side, parallel to the solid-electrolyte membrane and then combining said at least a portion of the water with any residual portion of the water to be treated.

5. Process as claimed in claim 4, wherein the electrolysis is carried out under pressure so as to produce an aqueous-ozone concentrate, with a high ozone content, and the concentrated solution is injected into the residual water which is to be treated.

6. Process as claimed in claim 4, wherein said at least a portion of the water to be treated is a major portion of the water to be treated.

* * * * *